Aug. 20, 1963   A. E. DE BARBA   3,101,137
MEANS FOR EFFECTING UNDIRECTIONAL ROTATION
Filed Jan. 11, 1961   2 Sheets-Sheet 1

INVENTOR
ALBERT E. DeBARBA
BY
*Mandeville & Schweitzer*
ATTORNEYS

Aug. 20, 1963   A. E. DE BARBA   3,101,137
MEANS FOR EFFECTING UNIDIRECTIONAL ROTATION
Filed Jan. 11, 1961   2 Sheets-Sheet 2

INVENTOR
ALBERT E. DeBARBA
BY
ATTORNEYS

United States Patent Office 3,101,137
Patented Aug. 20, 1963

3,101,137
MEANS FOR EFFECTING UNIDIRECTIONAL ROTATION
Albert E. De Barba, Wolcott, Conn., assignor to Consolidated Electronics Industries Corp., Waterbury, Conn., a corporation of Delaware
Filed Jan. 11, 1961, Ser. No. 82,027
5 Claims. (Cl. 192—4)

This invention relates to mechanical means for insuring uni-directional rotation of rotating devices, such as alternating-current synchronous motors, which have bidirectional starting and running characteristics.

The alternating-current synchronous motor is used in a multitude of constant speed devices, such as clocks, cycle timers, record player drives and so forth, because the constancy of its running speed is inherently dependent upon the constancy of the frequency of the alternating current supply voltage and this frequency is closely controlled by most power companies. Moreover, small, reliable, long-lived synchonous motors are easy and inexpensive to manufacture and they require little or no maintenance.

In the present state of the art most types of synchronous motors may be made, by relatively simple and inexpensive techniques, to be self-starting. However, provisions for self-starting do not by themselves overcome another inherent characteristic of many synchronous motors, namely, they will quite unpredictably start and run in either direction.

While there are known electro-magnetic techniques for causing synchronous motors to start and run in a desired direction, the cost of applying these techniques to an otherwise inexpensive motor becomes a relatively large part of the total manufacturing cost. Moreover, the design compromises which arise in the application of these techniques necessary to make such motors self-starting in the desired direction frequently have a detrimental effect on the other characteristics of the motor; that is, the starting and running torque may be reduced and the power consumption under running conditions may be appreciably increased. Therefore, it is apparent that uni-directional means external of the motor itself may be highly advantageous, provided only that it is inexpensive relative to electro-magnetic means and does not absorb more power than would be sacrificed by the application of such techniques.

I have invented simple and inexpensive mechanical means, capable of use with rotating devices such as synchronous motors, to insure that such devices do not start and run in an undesired direction even though the starting and running characteristics of the device itself are unpredictably bi-directional. Apparatus according to my invention comprises a first gear means adapted to be rotatably driven by a rotating device and a rotatably mounted second gear means which is adapted to be driven by said first gear means. The apparatus further comprises rotation stopping means mounted for pivotal motion about an axis and having means thereon for engaging said first gear means when the stop member is in a predetermined angular position about its axis. The stopping means is so mounted as to be in frictional sliding contact with the second gear means, such that, in the absence of opposing torque greater than the torque due to frictional forces acting between the stopping means and the second gear means, the stopping means is driven about its axis by the second gear means. I also provide means for limiting the pivotal motion of the stopping means to a predetermined angular range about its axis such that the engaging means on the stopping means interferingly engages the first gear means at one end of the range of angular motion and is out of engagement with the first gear means at the other end of the range.

A rotating device, equipped with apparatus according to this invention, which starts and continues to run in the desired direction will also drive the first and second gear means in directions corresponding to the desired direction of rotation of the rotating device. It will be readily understood that the actual directions of rotation of the first and second gear means will not necessarily be the same as the direction of rotation of the device itself. Due to the frictional sliding contact between the second gear means and the rotation stopping means the latter will be driven in the same direction as the second gear means until it reaches the end of the range in that direction permitted by the limiting means. The stopping means will then cease its rotation, but the frictional forces between it and the second gear means will not be sufficient to interfere with the continued rotation of the second gear means or of the rotating device itself. Accordingly, the device will continue to rotate in this desired direction.

On the other hand, when the rotating device starts and runs in the undesired direction it will drive the first and second gear means in corresponding directions. The rotation of the second gear means in a direction corresponding to the undesired direction of rotation will drive the stopping means in the same direction until the engaging means on the stopping means engages the first gear means. As stated, the engaging means are positioned at the opposite end of the range of permissible rotation of the pivotally mounted stopping means. Thus, when the engaging means on the stopping means comes into engagement with the first gear means neither can continue to rotate in a direction corresponding to the undesired direction of rotation of the rotating device. If the rotating device is not inclined to reverse its direction spontaneously upon being prevented from running in the undesired direction it will assume a static position. On the other hand, if the device is inclined to reverse its direction upon being prevented from running in the undesired direction, it will now do so. Of course, it will drive the first and second gear means in directions corresponding to the desired direction of rotation. As before, the frictional contact between the second gear means and the stopping means will drive the latter in a direction so that it is taken out of engagement with the first gear means and will not interfere with rotation in the desired direction.

Specifically, apparatus according to the present invention is particularly useful in connection with alternating-current synchronous motors discussed in detail above. The paramount features of my invention are simplicity and reliability. Depending on the particular design, incorporation of the invention into an otherwise conventional synchronous motor involves the addition of a very few parts which are readily stamped or otherwise formed from conventional materials.

Another feature of the invention is that devices made in accordance therewith do not alter the characteristics of a conventional motor. Moreover, my invention provides means for insuring uni-directional starting and running of a motor compromising a design calculated to have optimum performance under running conditions. Also, apparatus according to the invention which has strength adequate to control a given motor will consume very little of the total output of the motor.

To enable those skilled in the art to understand my invention and be aware of its numerous features, I describe in the following specification particular embodiments of the invention. In the course of the description reference is made to the accompanying drawings in which:

FIG. 2 is a side elevation partly broken away of the apparatus shown in FIG. 1a;

Figure 2:
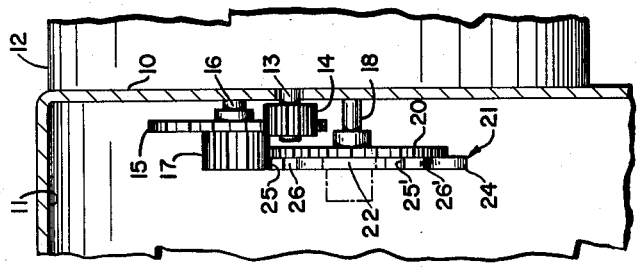
Figure 1A:
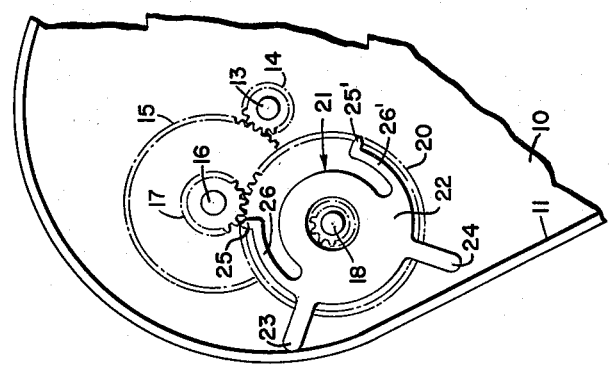
FIG. 1a is a plan view of a particular embodiment of the invention showing the components in the free-running position.
Figure 1B:
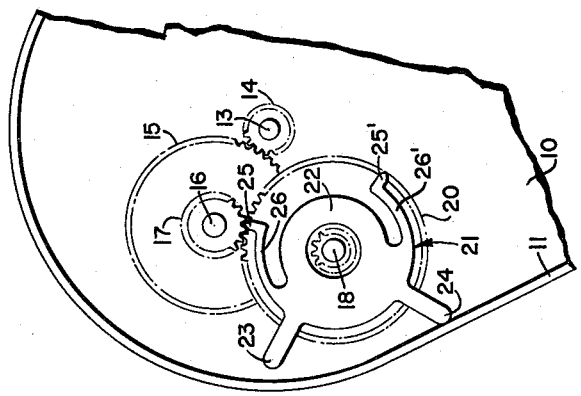
FIG. 1b is a plan view of the embodiment of FIG. 1a showing the components in the stop position.

Referring now to FIGS. 1a, 1b and 2, there is shown at 10 a frame member or base plate having a side wall 11 which extends outwardly from the base plate. In practice, the base plate and its side wall or walls may be part of the usual enclosure for the gear train of a clock mechanism.

On the back or lower side of the base plate there is mounted an alternating-current inductor type synchronous motor in a housing 12 as shown in FIG. 2. The rotor shaft 13 of the motor projects through an aperture in the base plate. A pinion 14 is mounted on the end of the shaft. In this embodiment the pinion 14 meshes with a gear 15 rotatably mounted on a shaft 16. A pinion 17 is fixed to the gear 15 so that the pinion and gear rotate together. A shaft 18 is fixed to the bed plate 10 at a position spaced from the shaft 16 so that a gear 20 mounted on the shaft 18 is in mesh with the pinion 17. As stated, FIGS. 1a, 1b and 2 show the invention embodied in the gear train of a clock mechanism. Obviously, additional pinions and gears may be incorporated as necessary to form a fully operative clock mechanism. However, the two pinions and the two gears described above are sufficient to illustrate the application of the invention. The remainder of the clock mechanism will be omitted in the interests of simplicity.

A rotation stopping member 21 is pivotally mounted on the shaft 18 so that it may rotate coaxially with gear 20. In this embodiment the stop member comprises a solid central portion 22 with the side thereof adjacent the gear 20 being essentially flat. The stopping member 21 and the gear 20 are mounted relative to each other so that the flat side of the central portion 22 is in frictional sliding contact with the flat face of the gear 20. Thus, when the gear 20 is caused to rotate by the motor acting through the pinions and gears 14, 15 and 17, there is a torque exerted in the stopping member 21 due to the frictional forces acting between the stop member and the gear 20. In the absence of opposing forces greater than the torque due to these frictional forces the stop member will be driven about the axis of the shaft 18.

The stopping member 21 is provided with angularly spaced rotation limiting arm members 23 and 24 which extend outwardly from the periphery of the central portion of the stop member and beyond the tooth circle of the gear 20. The dimensions and positions of these limiting members will be described in due course.

The stop member is also provided with a sector gear means which, in this embodiment, comprises the single tooth 25 on the distal end of the cantilever arm 26 which extends from the central portion 22 of the stop member.

The relative positions of the limiting members 23 and 24 and the sector gear tooth 25 is as follows. The members 23 and 24 are angularly spaced from each other on the periphery of the central portion of the stop member and they project outwardly from the central portion far enough so that a few degrees of rotation of the stop member will bring one or the other of them into positive interfering contact with some fixed structure, in this case an adjacent portion of the wall 11 on the bed plate 10. Thus, the cooperation between the limiting members 23 and 24 and the adjacent portion of the wall 11 defines a range of rotation for the stop member such that it can rotate in the counterclockwise direction only until the limiting means 23 contacts the wall 11 (see FIG. 1a) and it can only rotate in the clockwise direction until the limiting means 24 contacts the wall 11 (see FIG. 1b).

The length of the cantilever arm 26, which carries the single tooth 25, is such that when the stop member is rotated counterclockwise to one end of the range of rotation defined by the interference between the limiting means 23 and the wall 11, the tooth 25 is out of engagement with the pinion 17. On the other hand, the angular and radial positions of the tooth 25 are such that when the stop member is rotated to the other end of its range of rotation as defined by the interference between the limiting means 24 and the wall 11, the tooth is in engagement with a tooth on the pinion 17.

The operation of this embodiment of my invention can now be readily understood. It was designed to operate in conjunction with a motor where the desired direction of rotation of the motor is counterclockwise. Accordingly, when the pinion 14 is driven by the rotor in the counterclockwise direction the gear 15 and the pinion 17 will be driven clockwise and the gear 20 will be driven counterclockwise. The torque due to the sliding friction between the gear 20 and the stopping member 21 will drive the stopping member in the counterclockwise direction until the limiting means 23 strikes the wall 11, whereupon the stopping member will be prevented from rotating any further, but the gear train will continue to be driven by the motor so long as the motor is energized. If the motor starts and tries to run in the undesired direction, in this case, clockwise, the gear 15 and the pinion 17 will be driven counterclockwise and the gear 20 will be driven clockwise. In this case the torque due to the frictional forces acting between the gear 20 and the stopping member 21 will drive the stopping member clockwise until the tooth 25 on the cantilever arm 26 engages a tooth of the pinion 17 and the limiting means 24 strikes the wall 11 whereupon the entire mechanism will stop. It is characteristic of some types of synchronous motors that they are statically unstable so long as they are energized. Upon being brought to a stop as described such a motor will reverse its direction of rotation; that is, it will start and continue to run in the counterclockwise direction. Of course, the rotation of the pinions and gears of the gear train in directions corresponding to the desired direction of rotation of the motor will result in the pinion 17 driving the stopping member in the counterclockwise direction due to the interaction between the teeth of the pinion and the stopping member tooth 25. As before, the frictional forces acting between the gear 20 and the stopping member 21 will continue to drive the stopping member in the counterclockwise direction until the limiting means 23 strikes the wall 11. The stopping member will stop but the gear train and the motor will continue to run normally in the desired direction.

It will be noted that the stopping member 21 shown in FIGS. 1a and 1b is provided with a second cantilever arm 26' carrying a tooth 25'. As is apparent from the foregoing description, these have no function in this illustrative embodiment. Nevertheless, they are illustrated here to show the design of a stopping member which is adapted to cooperate interchangeably with gears or pinions, such as pinion 17, located at opposed positions about the periphery of the stop member.

Figure 3A:
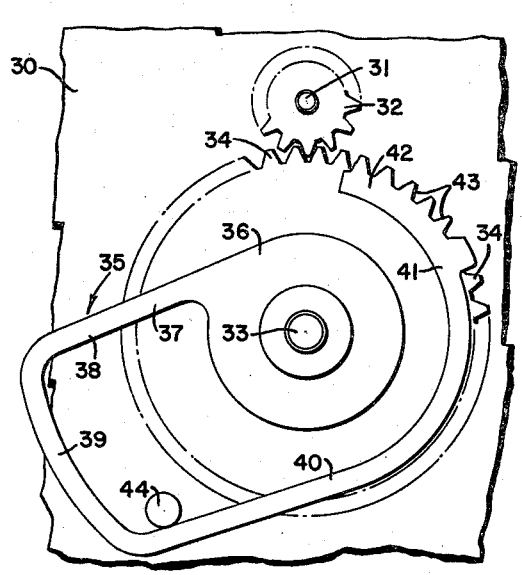
FIG. 3a is a plan view of another embodiment of the invention showing the components in the free-running position.
Figure 3B:
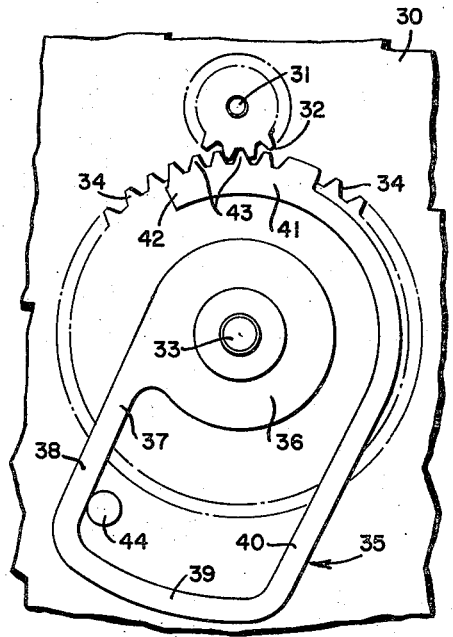
FIG. 3b is a plan view of the embodiment of FIG. 3a showing the components in the stop position.

In FIGS. 3a and 3b there is illustrated another embodiment of my invention. As before, there is a frame member or a base plate 30 which may be one wall of a motor housing. The rotor shaft 31 of the motor projects through the plate 30 and carries a pinion 32 mounted for rotation therewith. A shaft 33 is mounted on the plate 30 and carries a gear 34 which meshes with the pinion 32. As in the case of the first embodiment the gear train of a complete clock mechanism would ordinarily include additional pinions and gears. In the interest of simplicity I will describe only the pinion 32 and the gear 34 which are necessary to the operation of this embodiment.

In this embodiment of the invention a stopping member 35 comprises a central portion 36 journalled on the shaft 33. The surface of the central portion 36 adjacent the gear 34 is essentially flat and the two are mounted on the shaft so that they are in frictional sliding contact. There is no rigid connection between the gear and the stopping member. Thus, when the gear 34 is driven around the pinion 32 the frictional forces between the contacting faces of the gear and the central portion of the stopping member exert a torque on the stopping member which, in the absence of positive interference with the rotation of the stop member, will drive the latter in the direction of rotation of the gear 34.

In this embodiment the stopping member comprises a spiral cantilever arm 37 which extends from the central portion out beyond the periphery of the gear 34 as indicated at 38. The arm then curves to extend substantially parallel to the periphery of the gear wheel 34 as shown at 39 and then returns to overlay the gear wheel 34 as at 40. The distal end of the cantilever arm consists of a curved portion 41 which follows the root circle of the gear wheel 34. The curved portion 41 of the arm carries a gear sector portion 42 having a plurality of gear teeth 43.

Interfering means in the form of a single stud 44 fixed to the plate 30 is located outside the periphery of the gear wheel at a point where it can intercept the portions 38 and 40 as the stopping member 35 is driven by the gear 34 about the axis of the shaft 33.

The desired direction of rotation of the motor is counterclockwise. Accordingly, the stud 44 is positioned so that counterclockwise rotation of the pinion 32 will rotate the gear 34 and the stopping member 35 in the clockwise direction until the stud intercepts the portion 40 of the cantilever arm at an angular position about the axis of the shaft 33. In this position the pinion 32 is out of mesh with the teeth 43 on the gear sector 42 as is shown in FIG. 3a. This is the free-running position. Of course, any one of a number of positions of the stud would satisfy this condition, but the location of the stud must also be such that the stud will intercept the portion 38 of the cantilever arm when the stopping member has been rotated far enough in the counterclockwise direction so that the gear sector on the distal end of the arm is in mesh with the pinion 32 as shown in FIG. 3b. This is the stop position.

It will be apparent to the reader that where the gear sector has a plurality of teeth as in this embodiment the dimensions of the teeth should be substantially the same as the dimensions of the teeth on the gear wheel 34. As in the embodiment shown in FIGS. 1a and 1b a gear sector having only one tooth would be satisfactory provided the stud 44 were properly placed.

Figure 4A:
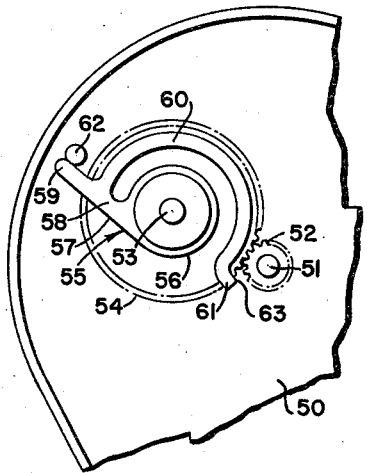
FIG. 4a is a plan view of another embodiment of the invention showing the components in the free-running position.
Figure 4B:
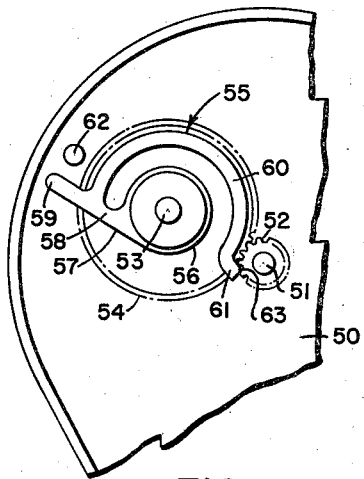
FIG. 4b is a plan view of the embodiment of FIG. 4a showing the components in the stop position.

FIGS. 4a and 4b show still another embodiment of the invention in which the plate 50 again serves as a frame member on which the components are mounted. As before, the rotor shaft 51 of the motor extends through the plate 50 and has a pinion 52 fixed to it. A shaft 53 spaced from the pinion 52 carries a gear 54 which meshes with the pinion 52 and is rotatably driven by it. There is also mounted on the shaft 53 a rotation stopping member 55 having a central portion 56 which is journalled on the shaft 53. As in the previously described embodiments the central portion has a surface adjacent the gear 54 which is essentially flat and is in frictional sliding contact with the surface of the gear 54. At 57 there is shown a supporting arm 58 extending from the central portion of the stopping member. This supports a sickle-shaped portion consisting of a "handle" 59 and a semi-circular "blade" 60. The "handle" portion extends outwardly beyond the periphery of the gear 54 and the "blade" portion has a contour which is spaced from and extends around the central portion 56 of the stopping member. At the distal end of the "blade" portion there is an out-turned part 61.

A stud 62 is fixed to the plate 50 outside the periphery of the gear 54. This stud extends upwardly from the bed plate far enough to intercept the "handle" portion of the stop member, and it is located at a position about the gear 54 with respect to the pinion 52 such that when the gear 54 is driven by the pinion 52 in the desired direction, that is clockwise, the stud intercepts the "handle" and prevents the stopping member from turning any further in the clockwise direction. Additionally, the proportions of the stopping member are such that when the stud 62 intercepts the "handle" 59 the out-turned distal end 61 of the "blade" is out of engagement with the teeth of the pinion 52, all as shown in FIG. 4a. This is the free-running position of the components of this embodiment.

In this embodiment the undesired direction of rotation of the rotor shaft 51 is clockwise. In the event that the motor starts in the clockwise direction the pinion 52 will drive the gear 54 in the counterclockwise direction and the torque due to the frictional forces between the gear and the stopping member will drive the stopping member in the same direction. But, as is apparent from FIG. 4b, the proportions of the "blade" portion 60 of the stopping member and the angular tip 63 of the out-turned end 61 are such that a few degrees of rotation of the stopping member in the counterclockwise direction will bring the tip 63 of the stopping member into interfering engagement with a tooth of the pinion 52 whereupon the rotation of the motor in this undesired direction will be stopped. In this embodiment the interference necessary to prevent rotation of the stopping member at one end of its range is obtained simply by making the tip 63 large enough so that it cannot mesh with the pinion 52 and be carried past it. I have also found it advantageous to position the tip so that it intercepts the teeth of the pinion outside the pitch circle of the gear 54.

As explained in connection with previously described embodiments, if the motor is statically unstable when energized, when the motor is stopped it will begin to rotate in the opposite direction. The stopping member will then be driven in the clockwise direction until the "handle" portion is intercepted and stopped by the stud 62 while the gear train will continue to be driven.

It will be observed that in each of the illustrative embodiments of the invention the means on the stopping member for interferingly engaging a preceding pinion or gear in the gear train, such that the sector gear means in FIGS. 1a, 1b and 3a, 3b or the tip of the out-turned end in FIGS. 4a, 4b is supported at the end of a cantilever arm. Although not an essential feature of the invention, those skilled in the art will realize that this is an advantageous feature. If the stopping member is made from a material such as #1010 cold rolled steel and is heat treated according to known techniques, then properly proportioned cantilever arms can be made resilient enough to absorb a substantial part of the shock load due to the rotor of the driving motor being brought to a sudden stop. It will also be observed that the energy absorbed in the cantilever arm may also be utilized to give the gear train and the rotor a small "kick" in the desired direction after they have been brought to a stop.

The foregoing descriptions of particular embodiments of my invention are solely for illustrative purposes. Many modifications will be apparent to those skilled in the art.

Also, the invention may be employed where it is only desired to prevent rotation in an undesired direction of a non-self-starting device. Accordingly, the invention is not to be limited to the details explicitly described above. The scope of the invention is defined in the following claims.

I claim:

1. Apparatus for insuring uni-directional rotation of an electric motor having bi-directional starting and running characteristics, comprising a first gear mounted for rotation and driven by said motor, a second gear mounted for rotation and driven by said motor, stopping means adapted to be rotatably driven by said first gear by slipping frictional contact therewith, said stopping means including a driving support portion positioned in frictionally contacting relation with said first gear and an engaging portion, said engaging portion including an elongated flexible cantilever arm having means at the distal end thereof adapted to engage at least one tooth of said second gear to block rotation thereof when said first gear and said stopping means are driven in an undesired direction through said frictional contact of said drive support portion with said first gear, said elongated flexible cantilever arm being operative to impart reliable resilient reversing rebound to said second gear, and means cooperating with said stopping means to limit the rotation of said stopping means when said first gear and said stopping means are driven in a desired direction.

2. Apparatus for insuring uni-directional rotation of an electric motor having bi-directional starting and running characteristics, comprising a housing, a first gear mounted for rotation and driven by said motor, a second gear mounted for rotation and driven by said motor, stopping means adapted to be rotatably driven from a first predetermined active position to a second predetermined inactive position by said first gear by slipping frictional contact therewith, said stopping means having a pair of limiting arm members extending therefrom, said stopping means including a driving support portion positioned in frictionally contacting relation with said first gear and an engaging portion, said engaging portion including an elongated flexible cantilever arm having means at the distal end thereof adapted to engage at least one tooth of said second gear to block rotation thereof when said first gear and said stopping means are driven in an undesired direction through said frictional contact of said drive support portion with said first gear, said engaging portion being adapted to remain out of contact with said second gear accommodating the free rotation thereof in a desired direction when said stopping means is driven in a desired direction to said second predetermined position, said elongated flexible cantilever arm being operative to impart reliable resilient reversing rebound to said second gear, and inner surfaces of said housing cooperating with said limiting arm members to limit the rotation of said stopping means beyond said first and second predetermined positions.

3. Apparatus for insuring uni-directional rotation of an electric motor having bi-directional starting and running characteristics, comprising a first gear mounted for rotation and driven by said motor, a second gear mounted for rotation and driven by said motor, stopping means adapted to be rotatably driven from a first predetermined active position to a second predetermined inactive position by said first gear by slipping frictional contact therewith, said stopping means including a driving support portion positioned in frictionally contacting relation with said first gear and an engaging portion, said engaging portion including an elongated flexible U-shaped cantilever arm having means at the distal end thereof adapted to engage at least one tooth of said second gear to block rotation thereof when said first gear and said stopping means are driven in an undesired direction through said frictional contact of said drive support portion with said first gear, said elongated flexible cantilever arm being operative to impart reliable resilient reversing rebound to said second gear, said engaging means being adapted to remain out of contact with said second gear acommodating the free rotation thereof in a desired direction when said stopping means is driven in said desired direction to said second predetermined position, and stud means situated intermediate the legs of said flexible U-shaped cantilever arm and alternatively cooperating therewith to prevent rotation of said stopping means beyond said first and second predetermined positions.

4. Apparatus for insuring uni-directional rotation of an electric motor having bi-directional starting and running characteristics, comprising a first gear mounted for rotation and driven by said motor, a second gear mounted for rotation and driven by said motor, stopping means adapted to be rotatably driven from a first predetermined active position to a second predetermined inactive position by said first gear by slipping frictional contact therewith, said stopping means including a driving support portion positioned in frictionally contacting relation with said first gear, and an engaging portion, said engaging portion including an elongated flexible radial cantilever arm the length of which exceeds the radius of said gear, said arm having attached in cantilever fashion thereto at a point within the radius of said gear a semicircular element, said semicircular element having a radius less than said gear, said semicircular element having means at the distal end thereof adapted to engage at least one tooth of said second gear to block rotation thereof when said first gear and said stopping means are driven in an undesired direction through said frictional contact of said drive support portion with said first gear, said engaging portion being adapted to remain out of contact with said second gear allowing the free rotation thereof in a desired direction to said second predetermined position, said elongated flexible cantilever arm being operative to impart reliable resilient reversing rebound to said second gear, and stud means cooperating with said radial arm to limit the rotation of said stopping means beyond said second predetermined position when said first gear and said stopping means are driven in a desired direction.

5. The mechanism of claim 4 in which said engaging means engages the teeth of said second gear at a point radially outward of the pitch circle of said gear.

References Cited in the file of this patent

UNITED STATES PATENTS

| | | |
|---|---|---|
| 2,722,297 | Gates | Nov. 1, 1955 |
| 2,788,455 | Kohlhagen | Apr. 9, 1957 |
| 2,960,201 | Berg | Nov. 15, 1960 |
| 2,985,778 | Fritz | May 23, 1961 |